(12) United States Patent
Bordignon et al.

(10) Patent No.: US 9,527,258 B2
(45) Date of Patent: Dec. 27, 2016

(54) COMPENSATOR FOR UNBALANCED COMPRESSION FORCES FOR PRESS MACHINES

(71) Applicant: BORDIGNON SILVANO S.R.L., Rossano Veneto (Vicenza) (IT)

(72) Inventors: Alberto Bordignon, Rosà (IT); Simone Bordignon, Rossano Veneto (IT)

(73) Assignee: BORDIGNON SILVANO S.R.L., Rossano Veneto (IT)

( * ) Notice: Subject to any disclaimer, the term of this patent is extended or adjusted under 35 U.S.C. 154(b) by 23 days.

(21) Appl. No.: 14/321,401

(22) Filed: Jul. 1, 2014

(65) Prior Publication Data
US 2015/0008628 A1    Jan. 8, 2015

(30) Foreign Application Priority Data

Jul. 8, 2013 (EP) ..................................... 13425099

(51) Int. Cl.
*F16F 9/54* (2006.01)
*B30B 15/00* (2006.01)
(Continued)

(52) U.S. Cl.
CPC ............ *B30B 15/007* (2013.01); *F16C 11/06* (2013.01); *F16F 9/54* (2013.01); *F16F 15/0232* (2013.01); *Y10T 403/32196* (2015.01)

(58) Field of Classification Search
CPC ......... B30B 15/007; F16F 15/021; F16F 9/54; F16C 11/06
(Continued)

(56) References Cited

U.S. PATENT DOCUMENTS 1,077,052 A * 10/1913 Dodds ....................... F22B 7/16
403/114
3,157,095 A * 11/1964 Heiser ................... F15B 15/223
267/119
(Continued)

FOREIGN PATENT DOCUMENTS

DE    43 29 176 A1    3/1994
FR    2 761 628 A1    10/1998

*Primary Examiner* — Bradley King
(74) *Attorney, Agent, or Firm* — Pearne & Gordon LLP (57) ABSTRACT

Described is a compensator (1) for unbalanced compression forces for press machines (100), comprising: a first body (20) having a first concave coupling surface (21) and a first end portion (22) opposite the first coupling surface (21); a second body (30) having a second convex coupling surface (31) and a second end portion (32) opposite the second coupling surface (31), the first (21) and second (31) coupling surfaces being geometrically coupled to each other in such a way as to allow a relative rotational movement between the first body (20) and the second body (30). More specifically, an end portion (22, 32) of at least one of the bodies (20, 30) is configured for being fixed to a structural element (101) of a press machine (100), the end portion (32, 22) of the other body (30, 20) being configured for forming an abutment surface designed to interact, in use, with a free end (402) of a stem (401) of a gas cylinder (400) of a press machine. The compensator is used, advantageously, in the correction of any misalignments and eccentricity of the compression cylinders during their use on a press machine, more specifically for molding.

10 Claims, 8 Drawing Sheets

(51) Int. Cl.
*F16C 11/06* (2006.01)
*F16F 15/023* (2006.01)

(58) Field of Classification Search
USPC ..................................... 267/219; 100/258 R
See application file for complete search history.

(56) References Cited

U.S. PATENT DOCUMENTS

| | | | | |
|---|---|---|---|---|
| 3,202,411 | A | * | 8/1965 | Heiser .................... B21D 24/02 |
| | | | | 267/119 |
| 3,386,324 | A | * | 6/1968 | Ihle ....................... B30B 15/068 |
| | | | | 100/258 R |
| 3,914,978 | A | * | 10/1975 | Sekanina .............. F16F 15/027 |
| | | | | 267/119 |
| 4,712,412 | A | * | 12/1987 | Roos ...................... B21D 24/14 |
| | | | | 267/119 |
| 5,301,598 | A | | 4/1994 | Sonnabend |
| 5,499,791 | A | | 3/1996 | Nakagawa et al. |
| 6,554,542 | B2 | * | 4/2003 | Mano ..................... E02D 27/34 |
| | | | | 405/251 |
| 2004/0104329 | A1 | | 6/2004 | Kainuma et al. |
| 2008/0078633 | A1 | | 4/2008 | Tsai |
| 2011/0016805 | A1 | | 1/2011 | Tsai |
| 2012/0096779 | A1 | | 4/2012 | Tsai |
| 2012/0117894 | A1 | | 5/2012 | Tsai |

* cited by examiner

COMPENSATOR FOR UNBALANCED COMPRESSION FORCES FOR PRESS MACHINES

This invention relates to a compensator for unbalanced compression forces for press machines.

More specifically, this invention relates to a compensator for compression forces which have a misalignment relative to an ideal straight line of application, in particular, an angular misalignment.

This invention is used, advantageously, in the correction of any misalignments and eccentricity of the compression cylinders during their use on a press machine, especially in the field of industrial moulding.

In the technical field of this invention, a compressive force exerted by a compression cylinder—which has a compression along a straight line of application which is not perfectly perpendicular—is said to be "unbalanced".

Generally, in the field of moulding, the use of compression cylinders is known to maintain the correct pressure between a mould and a matrix and, if necessary, also the position between them until a step of forming the mould is completed.

In other words, the presence of these compression cylinders in predetermined points of the mould means that the moulding pressure corresponds to the values planned for forming the part, the so-called "pressing".

According to the prior art, the compression cylinders are generally filled with inert gas and for this reason they are also called, more simply, "gas springs".

According to the prior art, the moulding press comprises an abutment element movable along guides and known in the jargon in the specific technical field as "ram" of the press.

More specifically, the matrix, also called the mating die, is installed on the ram of the moulding press: the ram equipped in this way performs a rectilinear stroke, generally vertical, until the mating die coincides with the mould, usually positioned at the base of the press and installed on the so-called press base.

Although the stroke of the press ram is rectilinear, the abutment surface of the ram is not always perfectly perpendicular to the axis of the stem of the above-mentioned gas springs facing the ram.

Generally, this misalignment is between 0° and 3°.

As a result of the above, when the compression cylinder is struck by the press ram the surface of the stem and the surface of the ram in contact with the stem may not be perfectly parallel with each other. In other words, the stem enters into contact with the surface of the ram in a configuration wherein the axis of the stem and the surface of the ram are not perpendicular.

The lack of parallelism between the contact surfaces of the stem and the ram means that the gas spring works with the stem not perfectly perpendicular to the relative base, with consequent irregular translation of the stem inside the cylinder. In other words, a force component transversal to the stem is generated.

This situation leads to a reduction in the working life of the gas spring due to an abnormal and excessive wear of the seal gaskets between stem and cylinder.

The wear of the gas spring seal also results in the loss of operational gas of the spring, thereby making it unusable.

In addition, the excessive and non-uniform sliding of the stem on the seals and on the internal parts of the gas spring can cause the seizing of the stem, making the interruption of the moulding process necessary.

In this regard, there are certain prior art systems for compensating the offset between the axis of the stem and the contact surface of the ram; an example of the prior art systems is shown in patent document U.S. Pat. No. 5,301,598.

The prior art systems are technically complicated, both in terms of geometrical complexity of their mechanical parts and in terms of the total number of parts assembled in a finished piece.

For this reason, the maintenance and the regular inspections of the compensators are quite frequent, also requiring a special training of the technician for these operations.

In addition to the above, the prior art compensation systems are integrated in the gas spring (more specifically in the stem) and are made specifically for the specific operating conditions planned for the production process of the moulded semi-finished product. In effect, from one process for moulding a product to another—or in a different moulding step of a same product—there can be different settings of the press and of the forming moulds.

This particular aspect implies the making of a vast range of compensators, often with considerable differences between one model and another, so as to satisfy all the different production parameters.

It should be noted that all the above-mentioned aspects as a whole increase the costs, both during the production phase (and therefore the market price), and during maintenance of the compensator in the prior art, during its entire working life.

For this reason, the above-mentioned solutions only partly resolve the problem of compensating the offset between the axis of the stem and the surface of the ram, also introducing disadvantageously an evident technical complexity and a poor adaptability of use.

In this context, the technical purpose of this invention is to provide a compensator for unbalanced compression forces for press machines that is free of the above mentioned drawbacks.

More specifically, the aim of this invention is to provide a compensator for unbalanced compression forces which is simple to design and produce and, more in particular, comprises a smaller number of elements compared with the prior art.

In addition, the aim of this invention is to provide a compensator for unbalanced compression forces which has considerable flexibility of use, that is to say, its use is possible in different conditions for moulding a same product or for different moulded products.

These and other aims are substantially achieved by a compensator for unbalanced compression forces for press machines as described in the claims herein.

Other features and advantages will become more apparent from the detailed description of a preferred non-limiting embodiment of a compensator for unbalanced compression forces according to this invention.

Figure 1A:
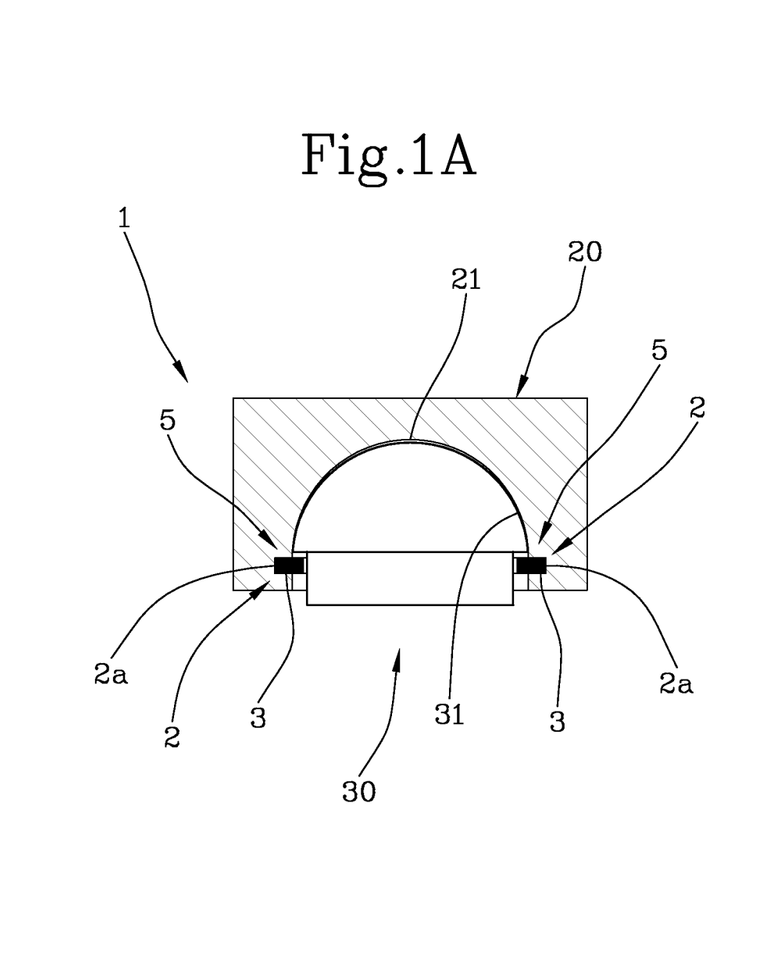
FIG. 1A is a cross-section view of a compensator according to a first embodiment of this invention.
Figure 1B:
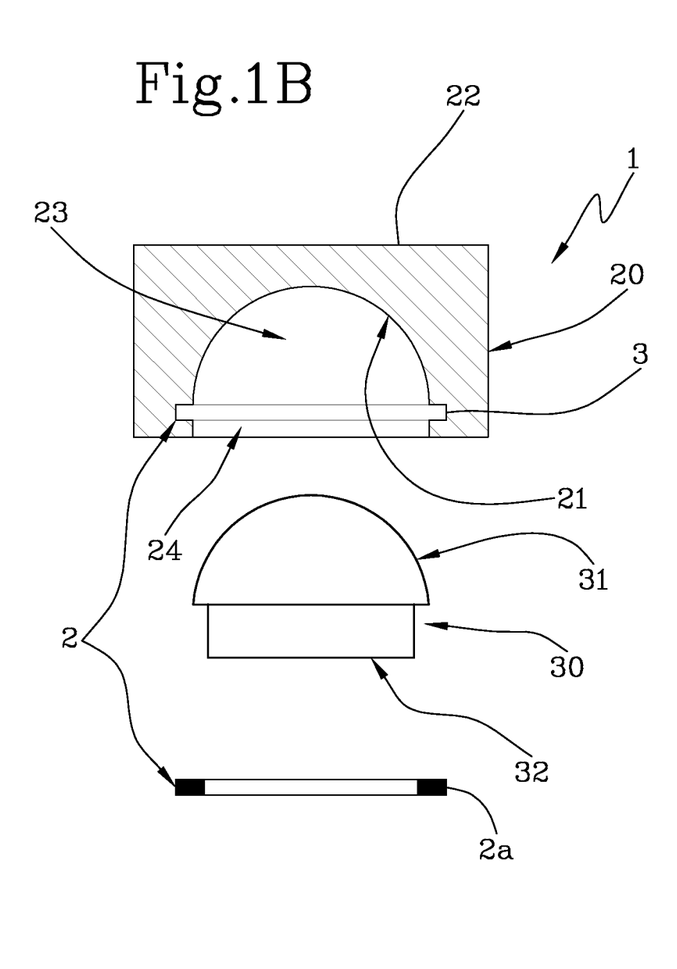
FIG. 1B is an exploded view of the compensator of FIG. 1.

The description is provided below with reference to the accompanying drawings, which are also non-limiting and provided by way of example only, in which:

FIGS. 1A and 1B show in its entirety a compensator for unbalanced compression forces according to a first embodiment of this invention.

The compensator, denoted in its entirety with the numeral 1, comprises a first body 20 and a second body 30.

The first body 20 has a first coupling surface 21 and an end portion 22, opposite the above-mentioned first coupling surface 21.

The second body 30 has a second coupling surface 31 and an end portion 32, opposite the second coupling surface 31.

The first body 20 and the second body 30 are geometrically coupled to each other by the above-mentioned first coupling surface 21 and second coupling surface 31.

The first coupling surface 21 is concave in shape and designed to receive the above-mentioned second coupling surface 31 which is convex in shape.

The geometrical coupling made in this way between the first body 20 and the second body 30 is such as to allow a relative rotation between the two bodies.

More specifically, the geometrical coupling between the first body 20 and the second body 30 in the preferred embodiment of the compensator 1 is preferably of the spherical type.

However, in other embodiments of this invention and not illustrated in the accompanying drawings, all those geometrical couplings which are not strictly spherical, but which have an effect equivalent to the above-mentioned spherical coupling, are contemplated.

The rotational (spherical) coupling between the two bodies 20, 30 is common to all the embodiments illustrated.

Preferably, following the geometrical coupling between the first and second bodies 20, 30, the respective end portions 22 and 32 are positioned at the free ends (opposite to each other) of the compensator 1. With reference to FIGS. 1A and 1B, the compensator 1 comprises retaining means 2 active between the first body 20 and the second body 30 for keeping geometrically coupled between them the above-mentioned coupling surfaces 21, 31. Preferably, the retaining means 2 allow a geometrical coupling between the first body 20 and the second body 30 in a stable fashion, but at the same time they allow the reversibility in such a way as to allow the first body 20 to be separated from the second body 30. Preferably, the retaining means 2 comprise a retaining element 2a substantially annular in shape designed to form the mechanical seal of the geometrical coupling using an annular groove 3 made on the first body 20 and inside of which is housed the annular retaining element 2a.

In other words, the retaining means 2, in particular the retaining element 2a, allow the mechanical assembly of the compensator 1 and of its main elements, that is, the first body 20 and the second body 30.

For example, the retaining element 2a can be an elastically deformable ring, preferably metallic, having a rectangular or square transversal cross-section; alternatively, the retaining element can be a bezel seal.

Advantageously, any uncoupling of the two bodies 20, 30 of the compensator 1, whilst not planned, is unnecessary as the coupling surfaces 21, 31 are self-lubricated.

In the embodiment shown in FIGS. 1A and 1B, the first body 20 of the compensator 1 has a first portion 23, forming the above-mentioned concave coupling surface, and a second portion 24 on which the retaining means 2, specifically the retaining element 2a, are active.

In other words, the first portion 23 and the second portion 24 forming the first body 20 are made in a single piece and from a same material, thereby giving the first body 20 a single-block body structure.

Preferably, the first body 20 and the second body 30 are made from a metallic material or from other materials, providing they allow the predetermined slidability of the spherical coupling of the compensator 1. In a different embodiment of the compensator 1, illustrated in FIG. 2, the retaining element 2a is simultaneously partially inserted in a first annular groove 3 made on the first body 20 and in a second annular groove 4 made on the second body 30. In that case, the annular groove 4 will have a size such as to allow the mutual sliding between the coupling surfaces 21, 31. More specifically, the annular groove 4 will preferably have a size calculated in such a way as to allow the rotation of the body 30 for misalignments of between 0° and 3°.

Figure 2:
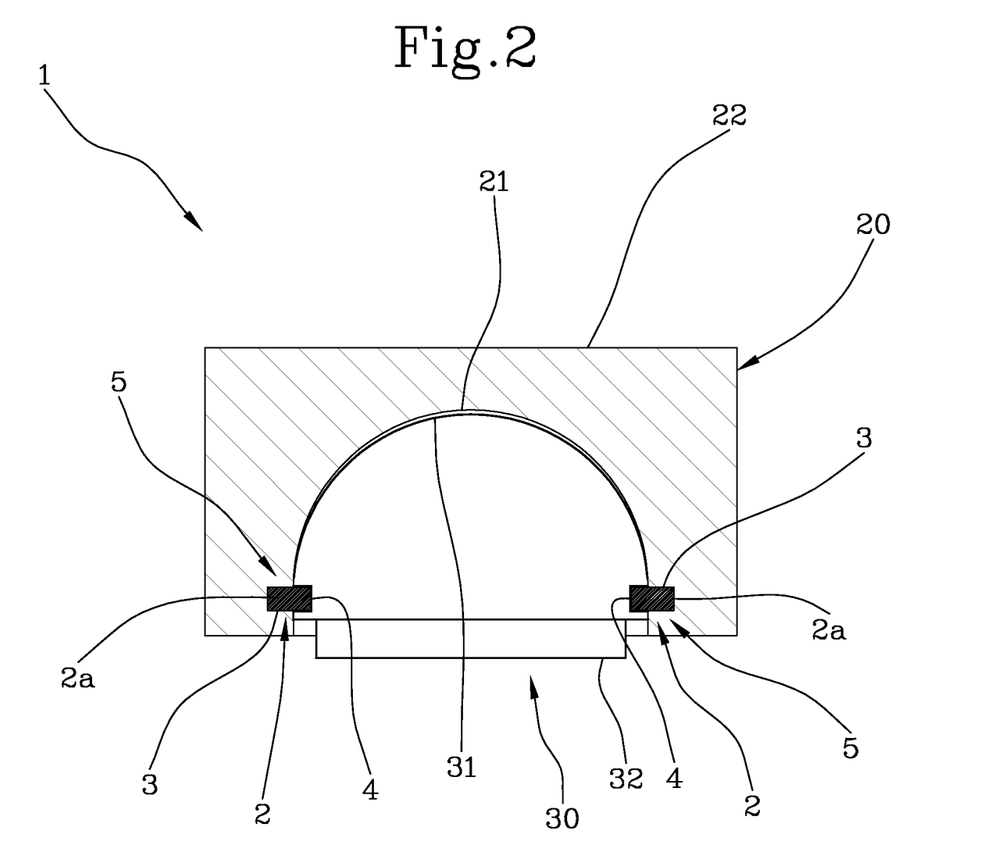
FIG. 2 is a cross-section view of a second embodiment of a compensator according to this invention.

In some cases, however, for example in the case of harsh uses and where the moulding step comprises the use of lubricating/cooling liquids, the compensator 1 can comprise the simultaneous presence of an elastic ring 2a sealing the coupling, inserted according to one of the above-mentioned embodiments and illustrated in FIGS. 1A-1B and 2, together with a elastic seal covering and protecting the joint. The above-mentioned combined solution of elastic ring 2a and elastic annular gasket is not illustrated in the accompanying drawings.

Figure 10A:
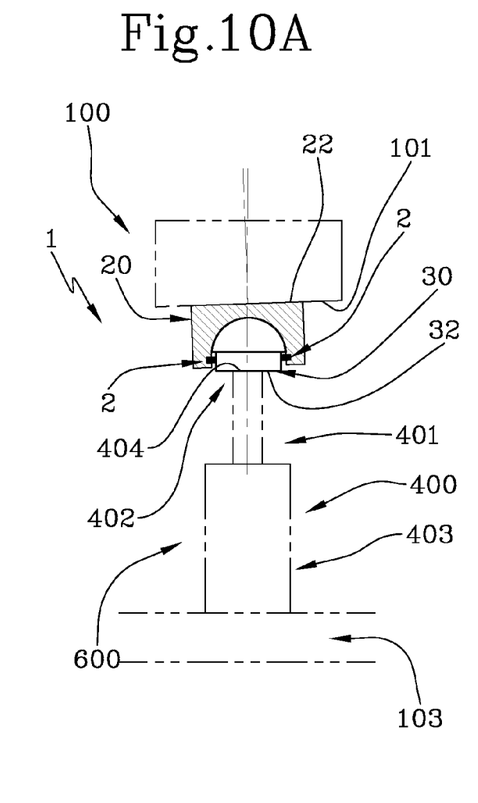
FIGS. 10A to 10C show an operating sequence of a compensator according to the embodiment of this invention illustrated in FIG. 1A.
Figure 10B:
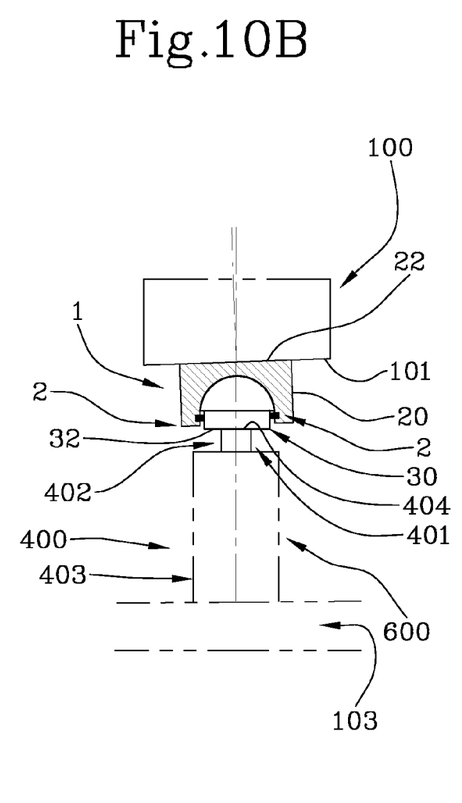
Figure 10C:
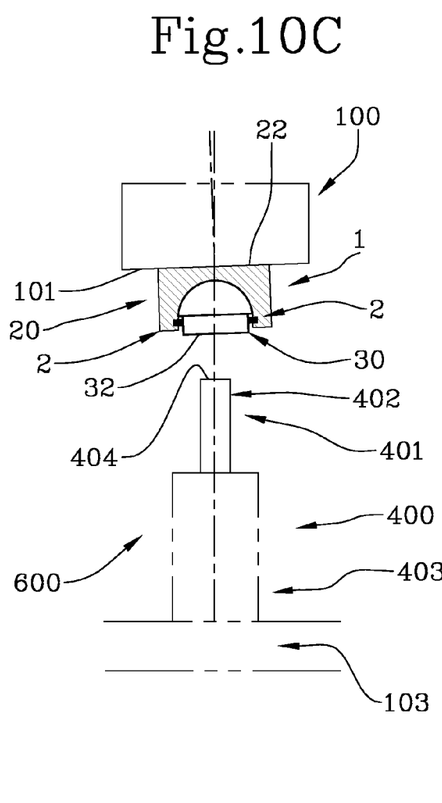

Advantageously, the compensator 1 according to this invention comprises that one of the two end portions 22 or 32 of the first body 20 and second body 30 is configured for being fixed to a press machine 100, typically for moulding, in particular to a structural element 101 of the press machine, for example the ram, whilst the end portion 22, 32 of the other body 20, 30 is configured for forming an abutment surface designed to receive, simply by resting, the free end 402 of a gas suspension element 400, in particular of a stem 401. FIG. 10A illustrates the above-mentioned operating condition, in a solution wherein the end portion 22 of the first body 20 is fixed to the structural element of the press, whilst the end portion 32 of the second body 30 receives, simply by resting, the free end 402 of the stem 401. This operating solution corresponds to the embodiments illustrated in FIGS. 4, 5, 6.

Figure 3:
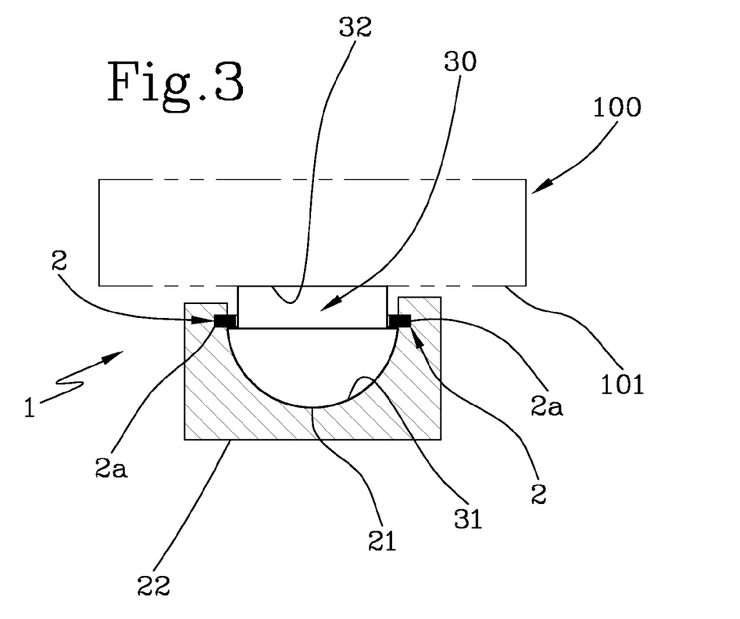
FIG. 3 is a cross-section view of the compensator of FIG. 1A in an operating configuration.
Figure 11:
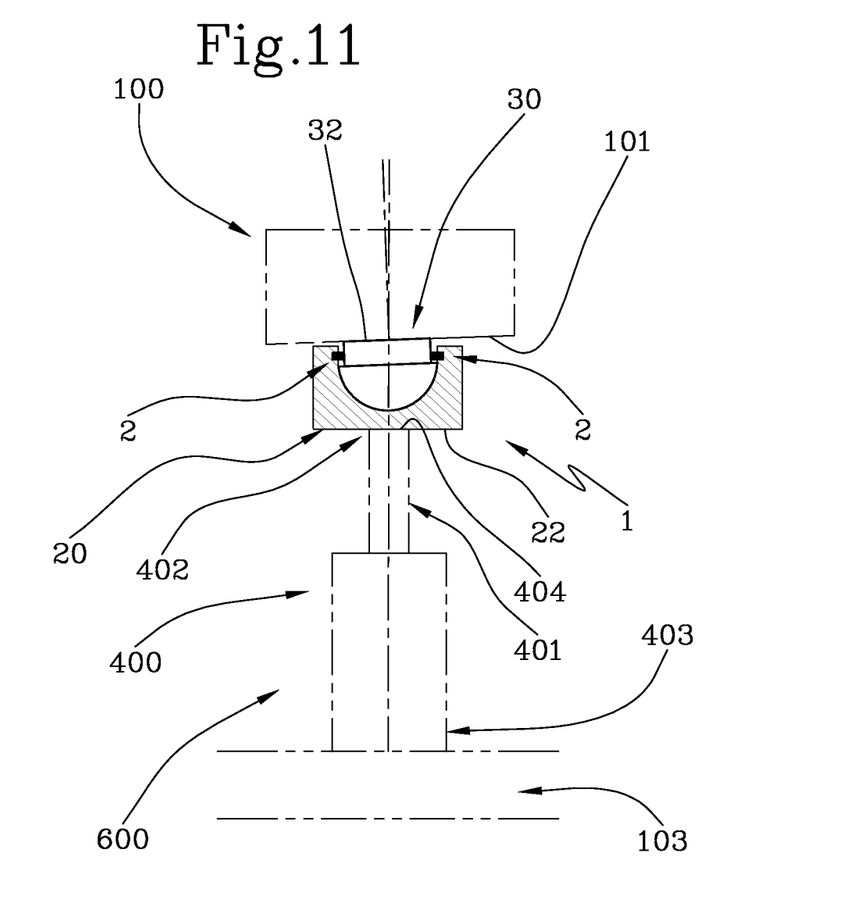
FIG. 11 shows a different operating step of the compensator with respect to that illustrated in FIG. 10A.

Vice versa, in a different operating solution the compensator 1 can have, for example, the end portion 32 of the second body 30 configured for being fixed to a press machine 100, typically for moulding, in particular to a structural element 101 of the press machine, for example the ram (see FIG. 3) or a part of the mould, whilst the end portion 22 of the first body 20 is configured for forming a an abutment surface designed to receive, simply by resting, a gas suspension element 400, in particular a stem 401 in a relative free end 402. FIG. 11 illustrates completely the above-mentioned operating condition. This operating solution corresponds to the embodiments illustrated in FIGS. 3, 7, 8. It should be noted that, according to this invention, the term "ram" refers to the structural element of the press designed to exert a compressive action on the stem of the gas spring, whilst the term "base" refers to the structural element of the press on which the cylinders of the gas springs are fixed.

Both the above-mentioned operating solutions are equally effective and valid and are absolutely interchangeable and can be used according to the process requirements of the specific moulding step.

Advantageously, the compensator 1 also comprises fixing means 6 for stably fixing the first body 20 or the second body 30 to the above-mentioned structural element 101 of the press 100, in particular, to the ram.

Preferably, the fixing means 6 comprise at least one threaded member 500, for example at least one screw of the hollow head or recessed head type screwed in a pre-prepared seat.

FIGS. 4 to 8 illustrate different solutions for fixing the compensator 1 to the structural element 101, that is, the ram, of the press 100.

More specifically, it should be noted that the term "fixing" of an end portion of the first body 20 or second body 30 to the ram 101 of the press 100 means that the body 20 or 30 is stably applied to the ram 101, but it is not essential that the above-mentioned fixing means 6 are directly made on an end surface 22 or 32, respectively, of the first body 20 or of the second body 30.

Figure 5:
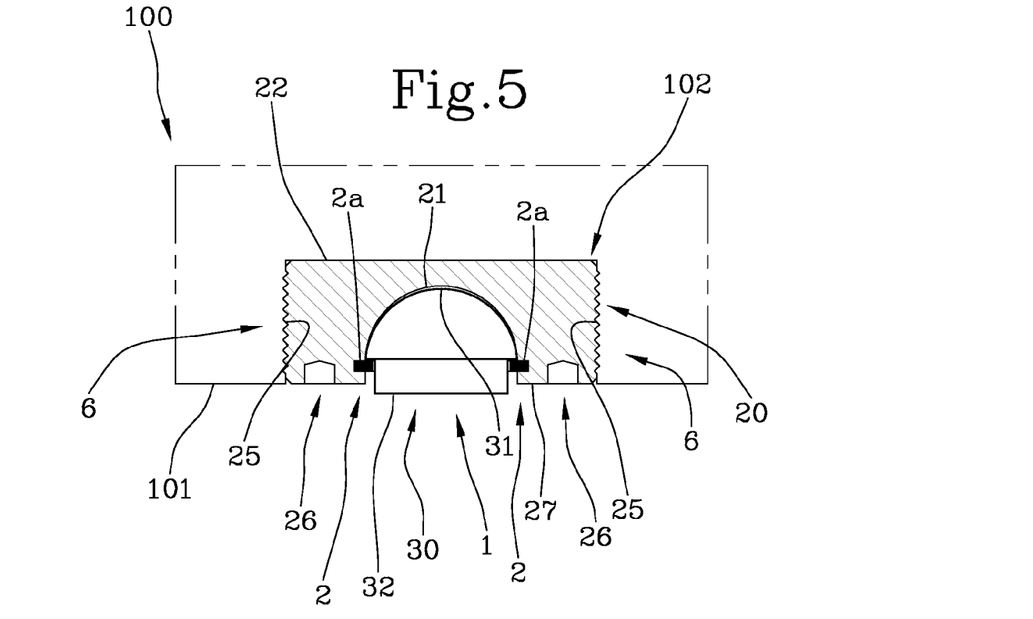
FIG. 5 is a cross-section view of a fourth embodiment of a compensator according to this invention in an operating configuration.

In effect, with reference to FIG. 5, advantageously the first body 20 can be directly screwed in a corresponding receiving portion 102 of the structural element 101 of the press 100, in particular using an external thread 25 made on a portion of side wall of the end portion 22. A plurality of recesses 26 made especially on a front surface 27 (positioned to the side of the coupling surface 21) of the first body 20 facilitate the screwing of the first body 20 in the receiving portion 102, in particular they facilitate the use with a screwing tool.

In this way the first body 20 is fixed to the ram 101 of the press 100.

Figure 4:
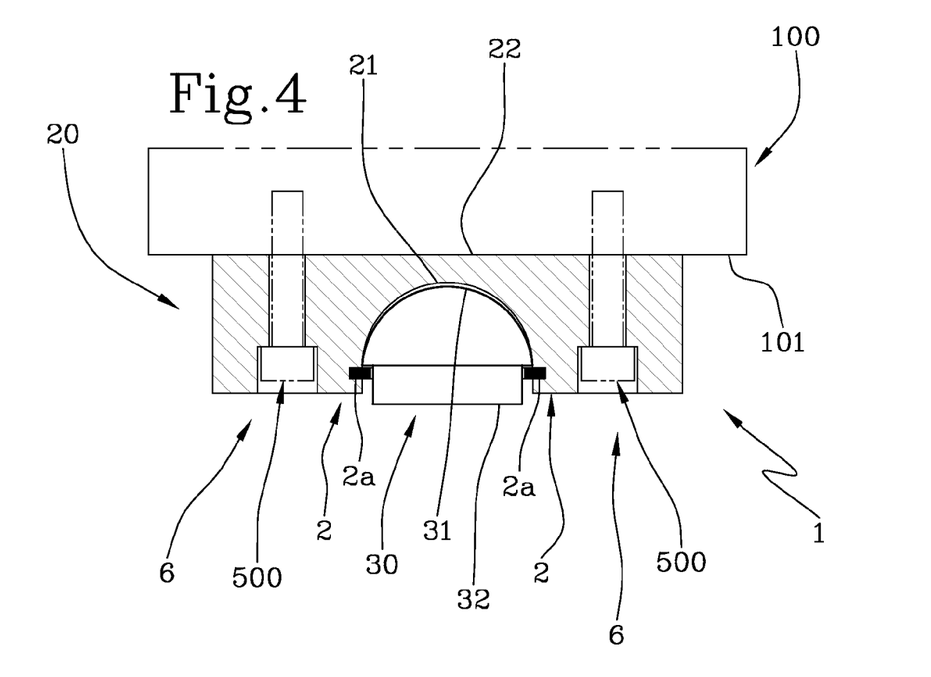
FIG. 4 is a cross-section view of a third embodiment of a compensator according to this invention in an operating configuration.
Figure 7:
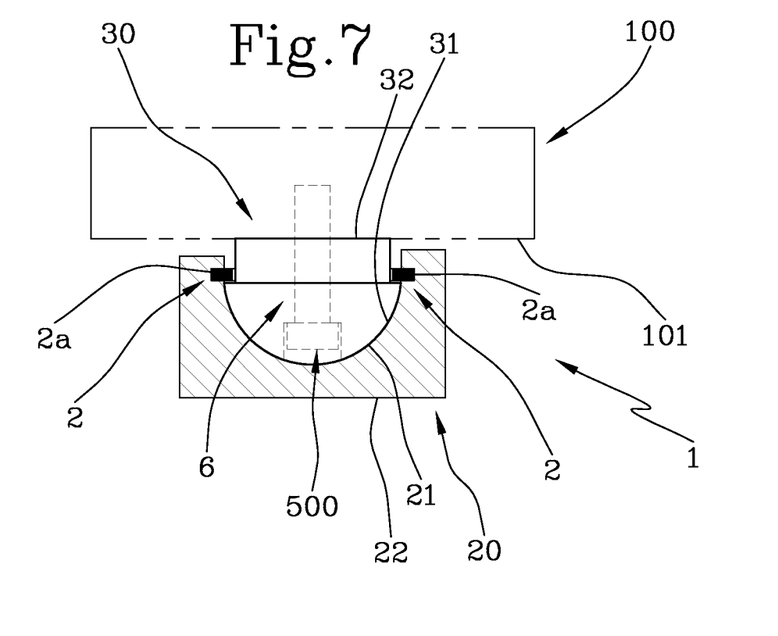
FIG. 7 is a cross-section view of a sixth embodiment of a compensator according to this invention in an operating configuration.
Figure 8:
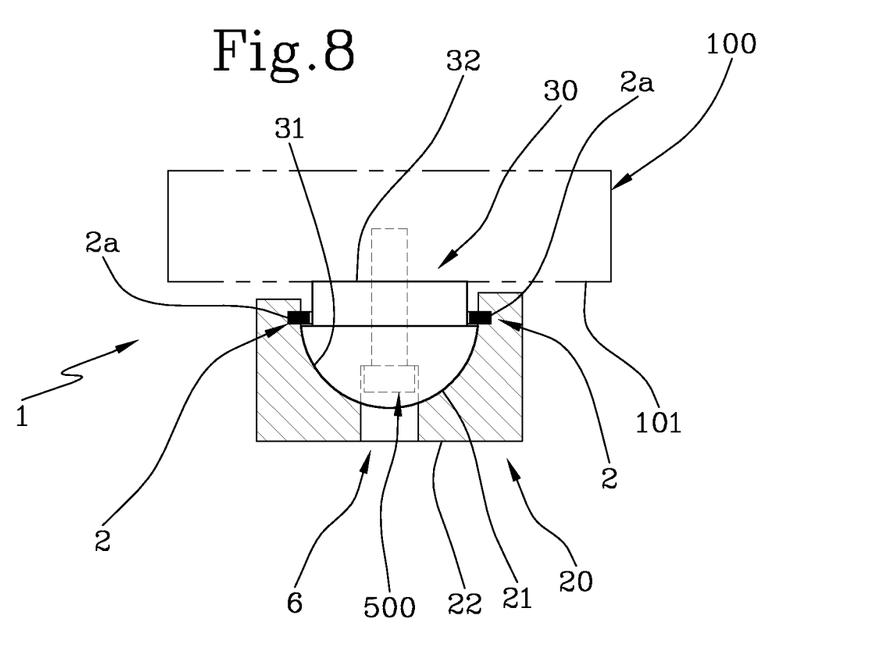
FIG. 8 is a cross-section view of a seventh embodiment of a compensator according to this invention in an operating configuration.

As illustrated in the remaining FIGS. 4, 7 and 8, and as an alternative to the solution described above and illustrated in FIG. 5, advantageously the compensator 1 has, at the end portion 22 or the end portion 32 (according to the fixing, respectively, of the first body 20 or of the second body 30 to the ram 101), at least one through hole for inserting a respective threaded member 500 for fixing the ram 101 of the press 100. More specifically, FIG. 7 illustrates a compensator 1 fixed using a threaded member 500 passing in a hole through the second body 30 and subsequently hidden by the first body 20 once the compensator 1 has been completely assembled in situ (solution with initial fixing of the second body 30 to the ram 101 and, subsequently, application of the first body 20 to the second body 30 and stable connection to it using the retaining means (2).

FIG. 8, on the other hand, illustrates a compensator 1 fixed to the ram 101 using a threaded member 500 passing in a hole through the first body 20 and the second body 30 (solution in which the compensator 1 can be fixed directly to the ram 101 in a reciprocal already assembled configuration of the first and of the second body 20, 30).

Figure 6:
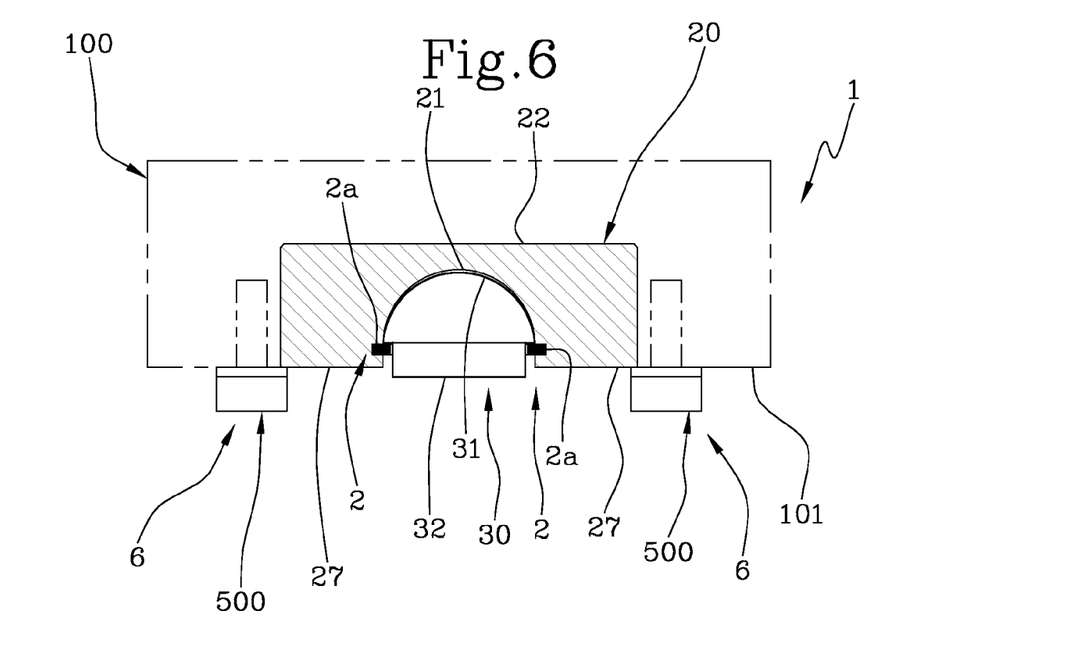
FIG. 6 is a cross-section view of a fifth embodiment of a compensator according to this invention in an operating configuration.

According to the different embodiment of FIG. 6, at least one threaded member 500 is used for packing the end portion 22 of the first body 20 to the ram 101 of the press 100 making the front surface 27 of the first body (that is, the surface of the first body 20 which has the coupling surface 21) work with a portion of the head of the threaded member 500.

It should be noted that this invention comprises further systems for fixing the compensator 1 other than those described and illustrated above, which are technically equivalent to them.

For example, protrusions which can be inserted on holes of the structural element of the press, stud bolts fixed in the structural element of the press, or locking pins or threaded grub screws.

With reference to FIGS. 10A to 10C and 11, the above-mentioned gas suspension element 400 is generally included in an apparatus 600 for the balanced suspension of structural elements 101, such as a ram of a press machine 100, typically for moulding.

The suspension element 400 has a cylinder 403 and a stem 401 slidably coupled to the cylinder 403 and subject to an opposing action by the gas. With reference to FIGS. 10A to 10C and 11, the apparatus 600 also comprises a compensator for compression forces according to one of the above-mentioned embodiments of this invention.

Advantageously, the apparatus 600 is such that the compensator 1 and the cylinder 403 operatively interact, simply by resting, between an abutment surface 22 or 32 of the compensator 1 and a head surface 404 of a free end 402 of the stem 401.

The operation of this invention is derived directly from the above-mentioned technical features. More specifically, the compensator 1 prevents the generation of force components in a direction transversal to the stem of the piston, as, when the stem 401 comes into contact with the surface of the compensator (22 or 32), the surface of the compensator rotates until resting completely on the surface 404 of the stem. In this situation, the surface of the compensator (22 or 32), the surface of the stem 404 and the supporting surface of the gas spring on the base, are perfectly parallel to each other and the stroke of the stem—moved by the ram of the press—will be perfectly at right angles to the supporting surface of the gas spring.

Figure 9:
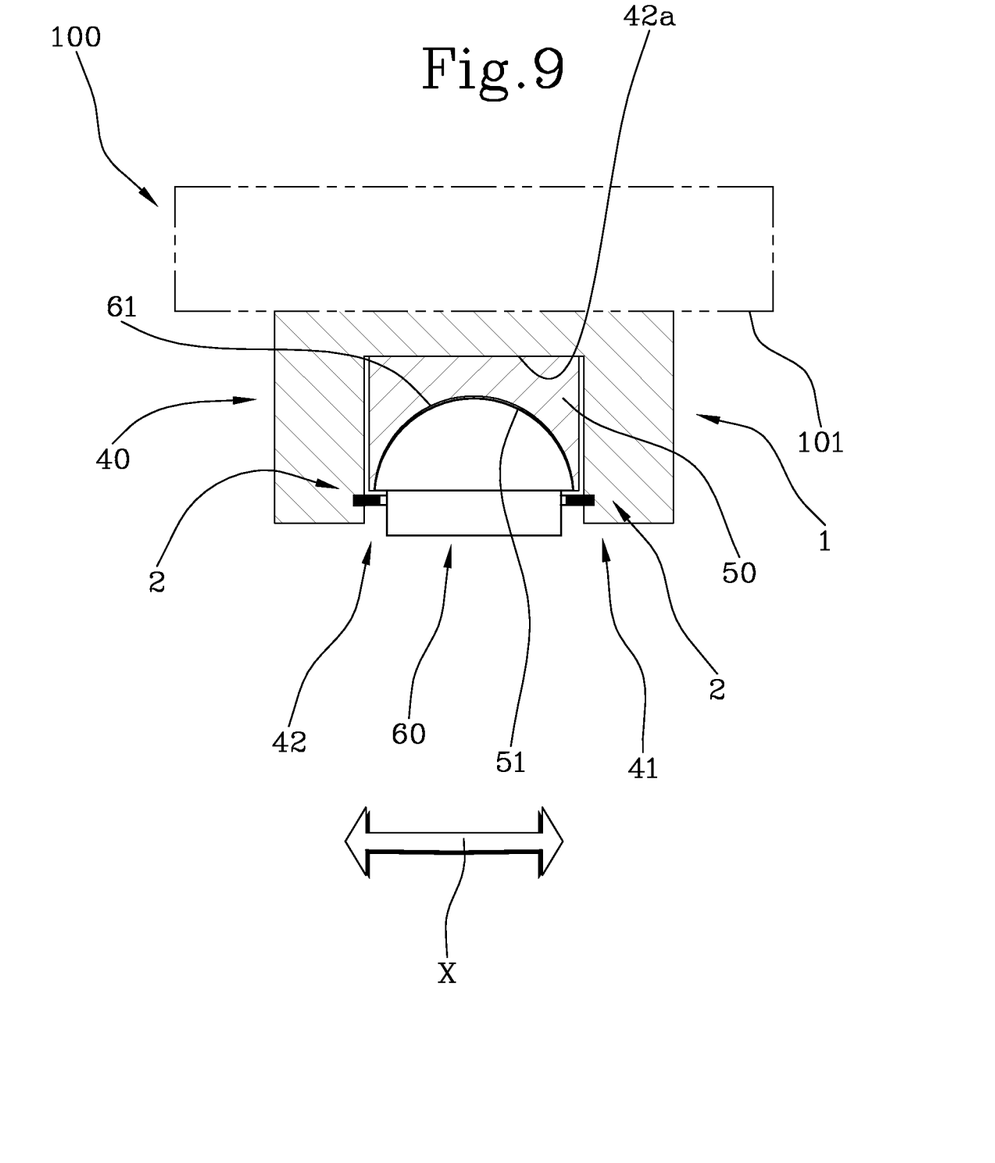
FIG. 9 is a cross-section view of a eighth embodiment of a compensator according to this invention in an operating configuration.

In an alternative embodiment of the compensator 1 according to this invention, and illustrated in FIG. 9, the compensator 1 is fixed to the ram 101 of the press 100 and the relative structure comprises:
- a first cup-shaped body 40 comprising a portion 41 having an open cavity 42;
- an insert 50 inserted inside the first body 40 and having a first concave coupling surface 51;
- a second body 60 at least partially inserted inside the cavity 42 of the first body 40 and having a second convex coupling surface 61 designed to make a spherical-type geometrical coupling with the concave surface 51 of the insert 50.

The distinctive nature of this embodiment of the compensator 1 is that the coupling between the insert 50 and the open cavity 42 of the first cup-shaped body 40 is preferably of the type without interference, even more preferably of the loose type.

In other words, the insert 50 is inserted inside the cavity 42 in such a way as to have a freedom of movement in at least one direction "X" parallel to the bottom surface 42a of the cavity 42.

Preferably, the above-mentioned apparatus 600 also comprises retaining means 2 active between the first and the second body 40, 60 for keeping geometrically coupled between them the coupling surfaces 51, 61 of the insert 50 and of the second body 60. Therefore, unlike the other solutions described above, the retaining means 2 in this embodiment are not active between the two structural elements of the compensator 1 which form the two coupling surfaces 51, 61 but between the first and the second body 40, 60, the first body 40 forming the cavity 42 for housing the insert 50.

The compensator 1 in the embodiment of FIG. 9 allows a significant transversal adjustment "X" during the making of the support between the compensator 1 and the head portion of the stem of the gas suspension element.

The transversal adjustment "X" which the compensator 1 in the above-mentioned embodiment allows is between, for example, 0.1 and 2 mm.

With reference to FIGS. 10A to 10C and 11, according to a wider point of view of this invention, a press machine 100 is defined, typically for moulding, such as a machine comprising a first and a second structural element 101, 103 movable towards and away from each other, for example a ram and a base, and a suspension element 600 as described above, interposed between the structural elements 101 (ram), 103 (base) of the machine 100.

Advantageously, the above-mentioned gas suspension element 400 is mounted on a first of the structural elements 101, 103, preferably on a base, and the compensator 1 is stably fixed to the second of the structural elements 101, 103, preferably to the ram 101 of the press 100.

In other words, the compensator 1 according to this invention is fixed to one of the structural parts of the press 100 and it is not fixed on the gas suspension element 400 as in the prior art.

Consequently, the compensator 1 is able, with a single model, to satisfy the widest range of operational requirements of the press 100.

In other words, this solution for assembly of the compensator 1 is extremely flexible in use, as it eliminates every combination with the gas suspension element used each time on the basis of the specific operational conditions of the press 100 (for example: stroke of the ram 101, speed or pressure exerted, etc.).

More specifically, the disengaging between compensator and gas suspension element allows compensators to be made having very large abutment surfaces, designed to receive in contact stems with different geometries and dimensions, with evident benefits in terms of standardisation of the components.

Furthermore, a larger surface of the compensator provides a greater fixing surface and therefore less mechanical stress of all the elements which make up the compensator and less pressure on the coupling surfaces.

Moreover, the simplicity of construction and the reversibility of the spherical coupling maintained with the reversible retaining means 2 allows a fast inspection and, if required, maintenance of the surfaces most stressed mechanically during operation of the compensator 1.

In addition, the compensator 1 according to this invention is advantageously made with a reduced overall number of elements (two bodies rotationally coupled with each other, without interposing an insert) which further favours a greater reliability and longer working life.

The invention claimed is:

1. A compensator for unbalanced compression forces for press machines, comprising:
    a first body having a first concave coupling surface and a first end portion opposite the first coupling surface;
    a second body having a second convex coupling surface and a second end portion opposite the second coupling surface, the first and second coupling surfaces being geometrically coupled to each other in such a way as to allow a relative rotational movement between the first body and the second body,
wherein an end portion of at least one of the bodies is configured for being fixed to a structural element of a press machine, the end portion of the other body being configured for forming an abutment surface designed to interact, in use, with a free end of a stem of a gas cylinder of a press machine, the first and the second body being mutually connected while being simultaneously fixed to a structural element of a press machine via said end portion of at least one of the bodies, whereby the compensator moves along with said structural element;
wherein the compensator further comprises a retaining element simultaneously partially inserted in a first annular groove made on the first body and in a second annular groove made on the second body, the second annular groove having a size such as to allow a mutual sliding between the first and second coupling surfaces, the second annular groove having an upper surface, a lower surface, and a side surface which connects the upper surface to the lower surface, the retaining element contacting or contactable with the upper surface to prevent upward movement of the retaining element relative to the second body.

2. The compensator according to claim 1, wherein at least one of the bodies has, at the respective end portion, a through hole for inserting a respective threaded member for fixing a press machine to the structural element.

3. A compensator according to claim 1, also comprising fixing means for stably fixing the first or second body to the structural element of a press machine, the fixing means comprising at least one threaded member.

4. The compensator according to claim 1, wherein the end portion of each body is threaded externally for being directly screwed inside a corresponding receiving portion of a structural element of a press machine.

5. The compensator according to claim 1, wherein the retaining element comprises an elastically deformable ring.

6. The compensator according to claim 1, wherein the coupling surfaces form a spherical connection.

7. A compensator according to claim 1, wherein the second annular groove has a size calculated in such a way as to allow a relative rotational movement between the first body and the second body of an angle between 0° and 3°.

8. An apparatus for suspending structural elements of a press machine, comprising:
    a compensator for unbalanced compression forces;
    a suspension element forming a gas compression spring, the suspension element having a cylinder and a stem slidably coupled to the cylinder and subject to an opposing action by the gas,
wherein said compensator for unbalanced compression forces comprises:
    a first body having a first concave coupling surface and a first end portion opposite the first coupling surface;
    a second body having a second convex coupling surface and a second end portion opposite the second coupling surface, the first and second coupling surfaces being geometrically coupled to each other in such a way as to allow a relative rotational movement between the first body and the second body, wherein an end portion of at least one of the bodies is configured for being fixed to a structural element of a press machine, the end portion of the other body being configured for forming an abutment surface designed to interact, in use, with a free end of the stem of the cylinder of the suspension element, the first and the second body being mutually connected while being simultaneously fixed to a structural element of a press machine via said end portion of at least one of the bodies, whereby the compensator moves along with said structural element;

wherein the compensator further comprises a retaining element simultaneously partially inserted in a first annular groove made on the first body and in a second annular groove made on the second body, the second annular groove having a size such as to allow a mutual sliding between the first and second coupling surfaces, the second annular groove having an upper surface, a lower surface, and a side surface which connects the upper surface to the lower surface, the retaining element contacting or contactable with the upper surface to prevent upward movement of the retaining element relative to the second body.

9. A press machine, comprising at least one first and one second structural element movable towards and away from each other, and a suspension apparatus according to claim 8, interposed between the structural elements, wherein the suspension element is mounted on a first of the structural elements and wherein the compensator is stably fixed to the second of the structural elements.

10. An apparatus according to claim 8, wherein the second annular groove has a size calculated in such a way as to allow a relative rotational movement between the first body and the second body of an angle between 0° and 3°.

* * * * *